June 30, 1964  R. M. L. ELKAN ETAL  3,139,183
EXTRUSION PRESS WITH ROTARY DIE-WHEEL
Filed April 2, 1962  4 Sheets-Sheet 1

INVENTORS
ROBERT MAX LUDWIG ELKAN
HERBERT JOHN SAMUEL
BY
ATTORNEYS

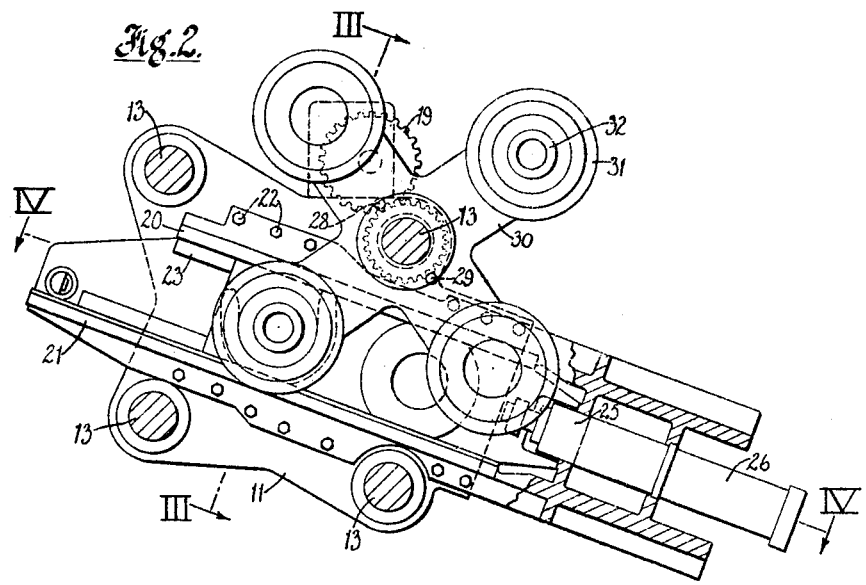
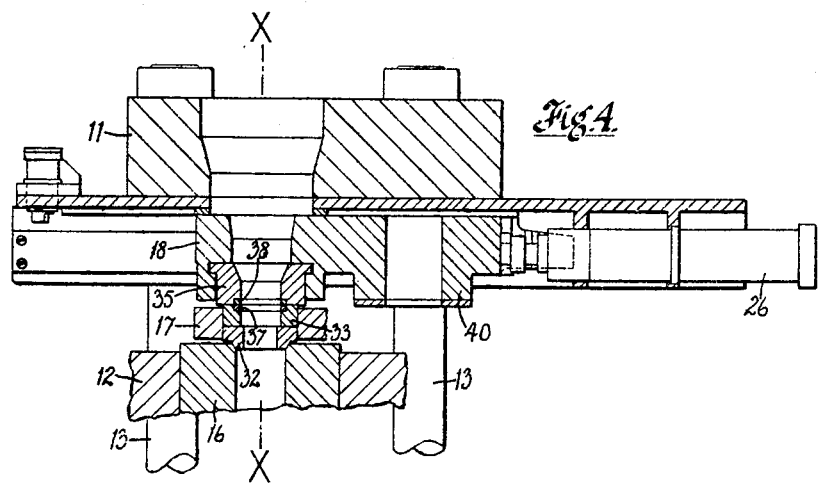

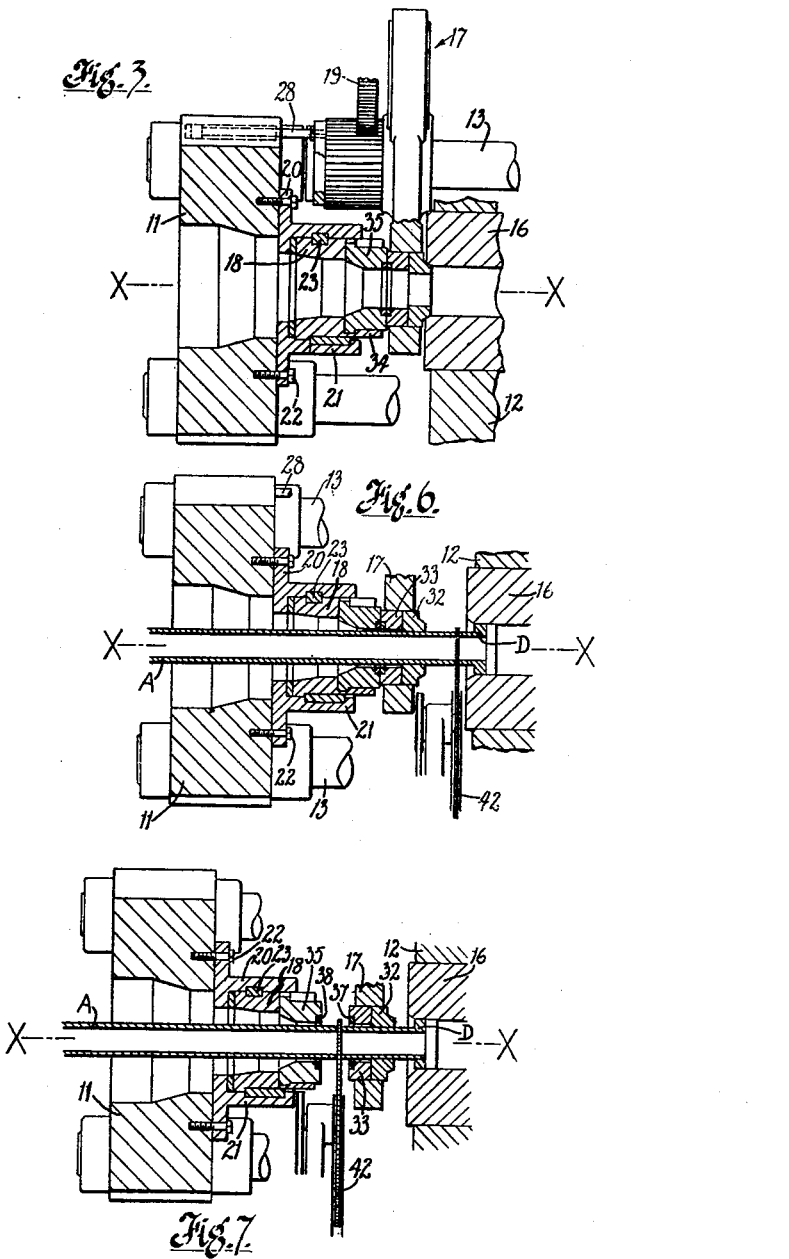

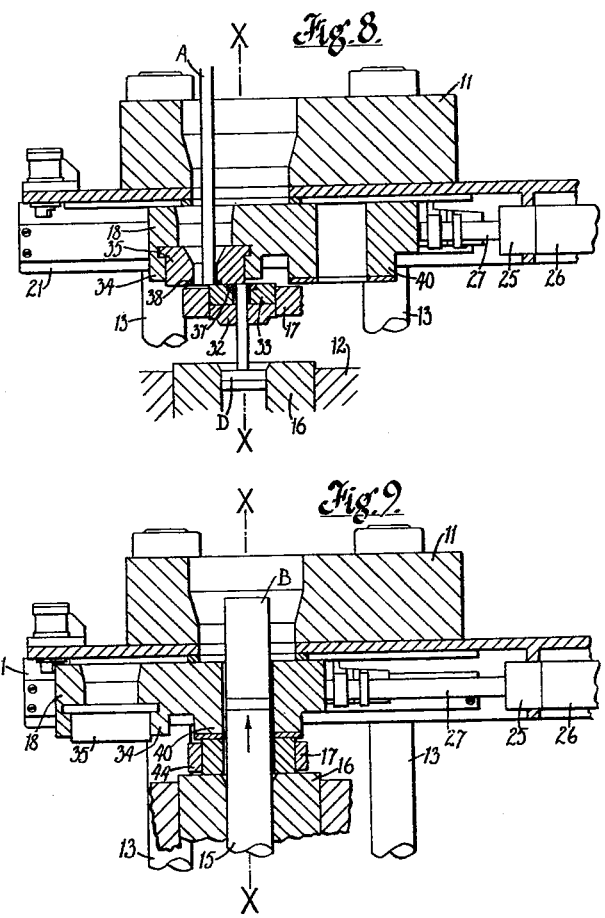

United States Patent Office  3,139,183
Patented June 30, 1964

3,139,183
EXTRUSION PRESS WITH ROTARY DIE-WHEEL
Robert Max Ludwig Elkan, Bournemouth West, and Herbert John Samuel, Northbourne, Bournemouth, England, assignors to The Loewy Engineering Company Limited, Bournemouth, England, a corporation of Great Britain
Filed Apr. 2, 1962, Ser. No. 184,168
1 Claim. (Cl. 207—1)

This invention relates to metal extrusion presses in which one or more dies, together with other parts of the die assembly, are arranged on a multi-station wheel or other rotary carrier which can revolve about an axis parallel to the extrusion axis of the press so that the dies can be successively placed in or out of line with the extrusion axis. It has been proposed to arrange in such a press a second wheel between the first one and the platen of the press and mount on the second wheel bolsters which co-operate with those parts of the die assembly mounted on the first wheel in transmitting pressure from the die to the platen. In this press both the billet container and the first wheel are movable in the direction of the extrusion axis independently of each other. It is thereby possible to enter a shear or saw either in the space between the container and the first wheel or between the second and the first wheel and thus sever the discard from the extruded article either in front or at the back of the die.

The arrangement next to each other of two rotary wheels of which one is movable in the extrusion axis leads to complications in the design and makes it necessary to use a drive with a telescopic shaft for both wheels if they are arranged co-axially with each other. It has further been found that die bolsters or other parts of the die assembly mounted on the second wheel do not have to be exchanged or reconditioned as frequently as the dies mounted on the first wheel. Rotation of the second wheel each time the first wheel is rotated is therefore an unnecessary effort.

It is an object of the present invention to provide an improved design of a metal extrusion press having a rotary multi-station die wheel which is adapted for the selective cutting of the discard either in front or at the back of the die and in which the die bolster or bolsters, co-operating with the dies on said wheel, are arranged on a carrier which can be moved relative to the extrusion axis.

According to the present invention the carrier for the die bolster or bolsters is in the form of a slide which can be traversed across the extrusion axis independently of the rotary die wheel so that the bolster or bolsters on said slide can be moved into and out of line with the extrusion axis independently of the position of the die wheel relative to that axis, said die wheel being movable in the direction of the extrusion axis relative to said slide and to the billet container of the press.

It is known to provide in metal extrusion presses slides mounting parts of the die assembly and adapted to be traversed across the extrusion axis. It is, however, novel to the best of our knowledge to provide in a metal extrusion press a slide mounting parts of a die assembly in combination with a rotary multi-station die wheel which can be moved in the direction of the extrusion axis and relative to the slide and the container.

The slide which is provided in the press according to the invention may be guided on the press platen and may mount one or two die bolsters, arranged side by side so that, by traversing the slide across the extrusion axis, one of the bolsters is moved into line with that axis and thereby into a position in which it co-operates with a die assembly on the rotary wheel in the transmission of pressure from the die to the platen, whilst the other bolster is moved at the same time into an outside position in which it is readily accessible for exchange or reconditioning. In the place of a second bolster there may be provided on the slide an aperture large enough for the passage therethrough of a billet. This opening is used when a billet or parts thereof cannot be extruded from the container bore and have to be ejected therefrom. It is clear that the die wheel is then provided also with a similar opening.

As stated before, the press according to the invention is adapted for the cutting of the discard either in front or at the back of the die. To this end the die wheel is axially movable relative to the container and to the slide in the direction of the extrusion axis, and the press is further provided with a shear or saw which is movable in a direction parallel to that axis so that the shear or saw may be entered either in the space in front or at the back of the die wheel.

Both the part of the die assembly on the die wheel facing the slide, and the bolster on the slide may be provided with knife edges so that upon displacement of the slide or of the die wheel or both the two edges cut through the extruded article and thereby sever the discard. With this arrangement there is no need to bring a separate saw or shear into operation. This method of cutting is particularly suitable for extruded articles of comparatively slender cross-section.

An embodiment of the invention will now be described by way of example with reference to the accompanying drawings in which:

FIG. 2 is a section through the press along the line II—II of FIG. 1.

FIG. 3 is a section along line III—III of FIG. 2.

FIG. 4 is a section along line IV—IV of FIG. 2.

FIG. 6 is a section similar to FIG. 3, showing the parts after the extrusion of a billet, with the container separated from the die wheel.

FIG. 7 is a section similar to that of FIG. 6, with the container separated from the die wheel and the die wheel separated from the slide.

FIG. 8 is a section similar to that of FIG. 4, with the container separated from the die wheel and the slide partly advanced.

FIG. 9 is a section similar to that of FIG. 8, with the slide fully advanced.

Figure 1:
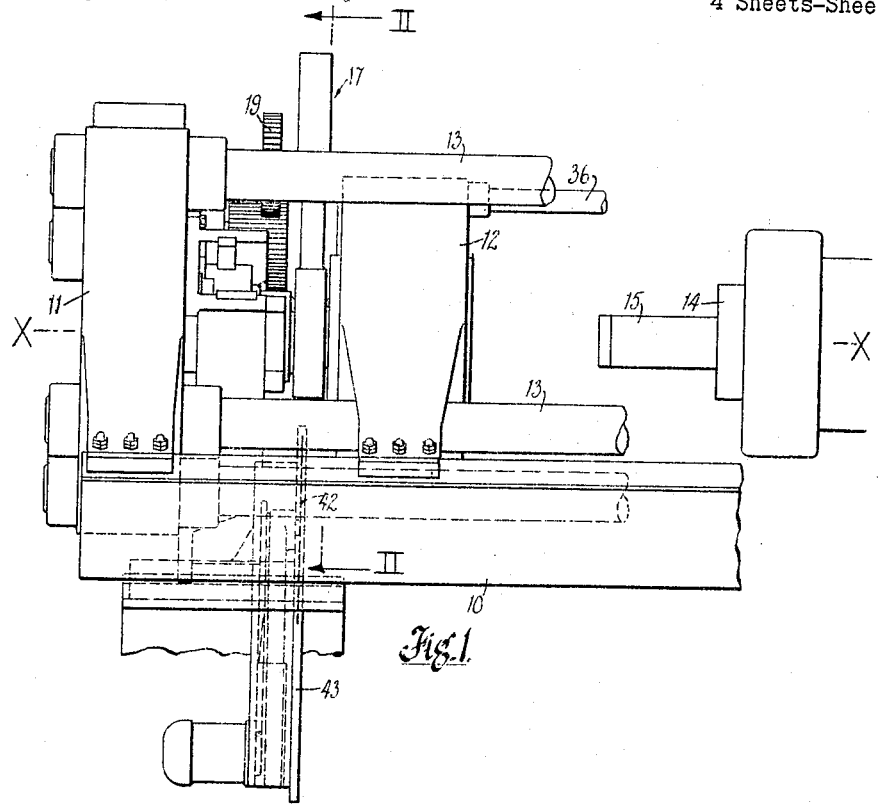
FIG. 1 is an elevation of the platen end of a press into which the invention has been incorporated.

The press shown in the drawings is of the horizontal type and comprises a bedplate 10 on which a platen 11 and a container housing 12 are mounted. The latter can be moved along the bedplate by means of rods 36 under hydraulic power. The platen 11 is connected by four columns or tie rods 13 to a cylinder, not shown in the drawings, in which a ram 14 is displaceable. Attached to the latter is a pressing stem 15 which is adapted to enter under hydraulic power the bore of a container 16 inside the housing 12.

The ram 14, pressing stem 15 and container 16 are arranged in axial alignment with each other, their common axis being referred to in the following as the extrusion axis of the press and indicated in the drawings at X—X.

The container housing 12 and the container 16 are arranged at a distance from the platen 11. Provided in the space between platen 11 and container housing 12 are a die wheel 17 and a slide 18. The die wheel is rotatably mounted on one of the upper columns 13 of the press and is driven through a reduction gear from a motor, not shown. Any other suitable drive for the wheel may be provided instead. The slide 18 is mounted in guideways 20, 21 which extend across the axis X—X of the press and are secured to the platen 11 by such means as nuts and bolts 22. The upper guideway 20 has a tongue 23 which is adapted to enter a matching groove in the slide. The slide can be displaced across the axis X—X by means of a ram 25 which is displaceable in a cylinder 26. The rod 27 of the ram 25 is detachably coupled to the slide 18 as shown in FIGS. 4 and 5, the latter illustrating the T-shaped groove 24 for the entry of the coupling.

The die wheel is axially displaceable by means of hydraulic ram-and-cylinder units 28, 29 (FIGS. 2 and 3).

The die wheel 17 comprises four arms 30 which are spaced apart by 90° and are formed at their ends with annular holders 31 in which a die 32 together with a backing-plate 33 can be inserted. The slide 18 is provided with a U-shaped bracket 34 which receives a bolster 35. The latter co-operates with the backing-plate 33 in the transmission of pressure from the die 32 to the slide 18 and from there to the platen 11, when the afore-mentioned parts are aligned with each other and in the axis X—X. The backing-plate 33 and the bolster 35 may each be formed at opposite edges with circular knives 37, 38 respectively.

Figure 5:
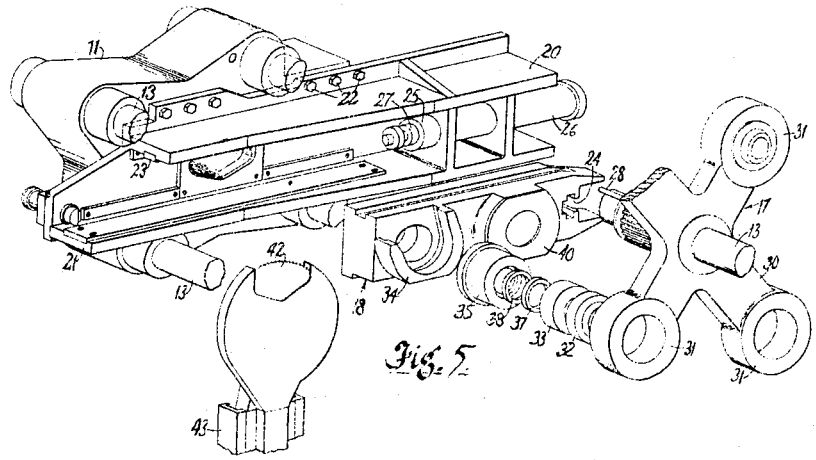
FIG. 5 is an exploded perspective view, showing the platen end of the press together with the slide, die wheel and a die assembly as well as a saw.

In the embodiment shown in FIG. 5, the die wheel 17 has two die essemblies, one in each of two diametrically opposite arms 30 whilst the holders 31 at the ends of the two arms 30 are left empty. They may be fitted with rings, having apertures sufficiently large to permit the passage therethrough of an unextruded billet. The slide 18 has in the embodiment shown in the drawings a single bracket 34 for the mounting of a bolster 35 is further formed with a substantially ring shaped boss 40, arranged next to the bracket 34. Displacement of the slide 18 through the ram 25 moves either the bracket 34 or the boss 40 into line with the axis X—X. The opening in the boss 40 is wide enough to permit the passage therethrough of a billet from the container 16.

A circular saw 42 is mounted in a frame 43. The frame can be displaced both parallel to the axis X—X and perpendicular thereto, so that the saw can enter the space between the die wheel 17 and the slide 18 for the separation of a discard either in front or at the back of the die 32.

FIG. 3 shows the various parts of the die assembly before the extrusion of a billet. In FIG. 6 a billet has been extruded into a tubular article A and a discard D left in the bore of the container 16. The container 16 has been separated from the die wheel 17 but the latter is still in the same position relative to the slide 16 as it was during the extrusion i.e. the backing-plate 33 is in contact with the bolster 35. The discard D can thus be severed from the extruded article A at the front of the die 32 as shown in FIG. 6.

In FIG. 7 the container 16 is moved by the same amount as before, but the die wheel 17 has been moved away from the slide 18 so that there is a space between the backing-plate 33 and the bolster 35. The saw 42 is shown in FIG. 7 as entering this space and separating the discard D from the extruded article A. The separation of the discard is thus effected at the back of the die 32.

Whilst the second method of discard shearing has the disadvantage of a slightly larger discard and therefore greater loss of material, it has the advantage that the extruded article does not have to be pulled through the die 32 after the discard has been sheared off.

In FIG. 8 the slide 18 has been displaced by a short distance from the position in FIG. 4 in which the bolster 35 is in the extrusion axis X—X so that the cutting ring 38 has become effective on the extruded article A.

In FIG. 9 the slide is fully displaced and the boss 40 moved in the place of the bolster 35. At the same time, the die wheel 17 has been moved so that one of the arms 30 whose holder 31 is fitted with a ring 44 is placed into alignment with the axis X—X. In this position a billet B can be ejected from the bore of the container 16 by the pressing stem 15 through the die wheel 17, and the slide 18 into the tunnel of the platen 11.

The press according to the invention has the advantage that it provides great flexibility of operation as regards the severing of the discard from the extruded article.

It is possible to effect the cutting of the discard at two different points, either in front of the die i.e. between die and container or at the back of the die i.e. between die-wheel and slide. Finally the shearing of the discard may also be effected by the displacement of die-wheel and slide relative to each other without the aid of a shear or saw.

Another advantage of the press according to the invention consists in that it provides relatively simple design whilst affording at the same time a rapid exchange of dies and adequate facilities for exchanging the bolster for the dies.

We claim:

A metal extrusion press having a platen, a die, bolsters interposable between said platen and said die, a rotary carrier for said die, the axis of rotation on said carrier being parallel to the axis of said die and said bolsters, means for rotating said die carrier, a slidable carrier for said bolsters, guide means for said slidable carrier on said platen, means for moving said slidable bolster-carrier along said guide means, said bolster-carrier sliding means being operable independently of the means for rotating said die carrier and means for moving said rotary die carrier parallel to the axis of said die toward and away from said bolsters, said moving means being separate and external to the means for rotating said die carrier and the means for slidably moving said bolster carrier.

References Cited in the file of this patent

UNITED STATES PATENTS

| | | |
|---|---|---|
| 2,858,017 | Kent et al. | Oct. 28, 1958 |
| 2,896,782 | Billen | July 28, 1959 |
| 3,019,894 | Delcroix et al. | Feb. 6, 1962 |